E. W. FRANKLIN.
POULTRY FEEDER AND EXERCISER.
APPLICATION FILED DEC. 11, 1908.
943,822.
Patented Dec. 21, 1909.
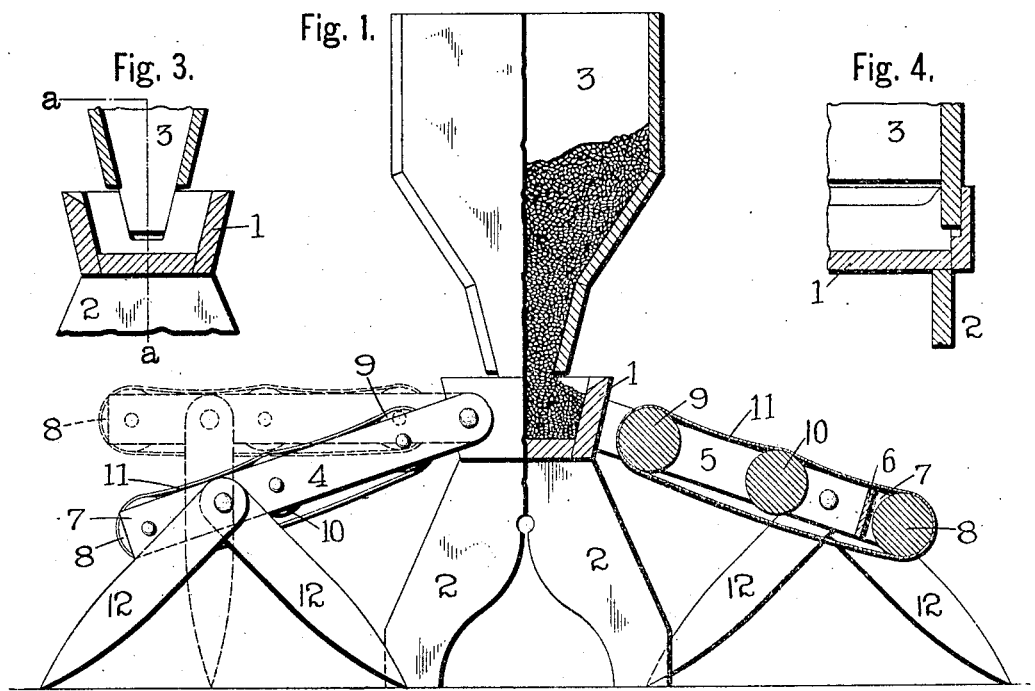
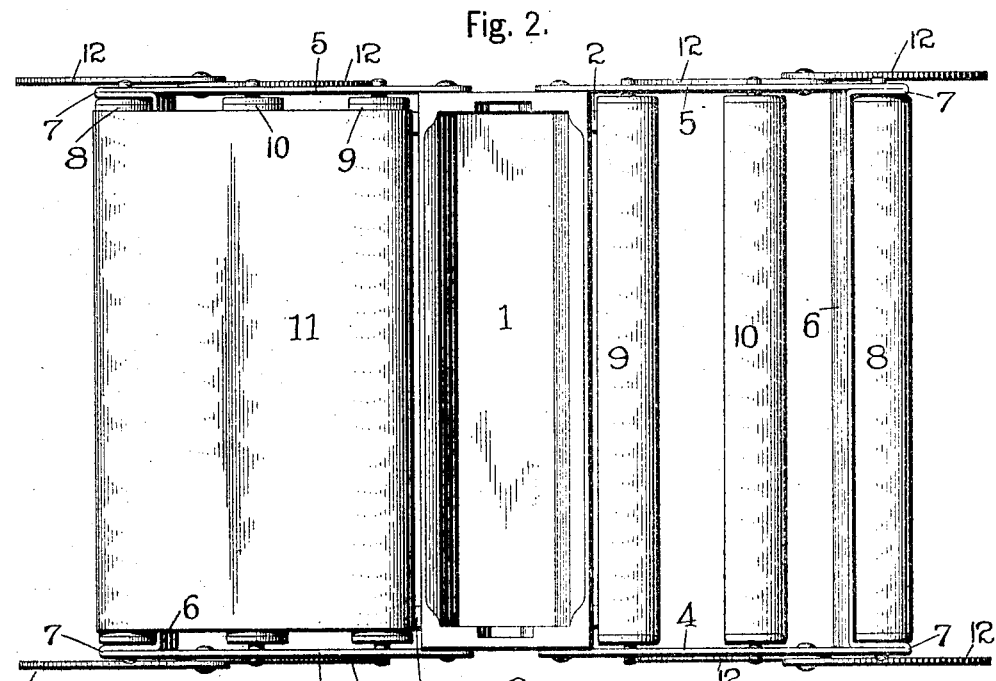

UNITED STATES PATENT OFFICE.

EDWARD W. FRANKLIN, OF SHERIDAN, NEW YORK.

POULTRY FEEDER AND EXERCISER.

943,822.

Specification of Letters Patent.   Patented Dec. 21, 1909.

Application filed December 11, 1908.   Serial No. 466,984.

*To all whom it may concern:*

Be it known that I, EDWARD W. FRANKLIN, a citizen of the United States, residing at Sheridan, in the county of Chautauqua and State of New York, have invented a certain new and useful Improved Poultry Feeder and Exerciser, of which the following is a specification.

This invention relates to a combined feeder and exerciser for poultry and the like and the object of the invention is to provide means whereby the fowl are compelled to exercise themselves while feeding. To this end, a tread mill mechanism is arranged in proximity to a trough or similar element containing feed, which the fowl operate while feeding thereby compelling them to exercise.

The invention also relates to certain details of construction which will be hereinafter described and claimed, reference being had to the accompanying drawings, in which,—

Figure 1 is a side elevation of the improved poultry feeder and exerciser with one half thereof shown in vertical section. Fig. 2 is a plan view of the improved poultry feeder and exerciser with the feed hopper and one of the endless bands removed. Fig. 3 is a fragmentary transverse action through the feed hopper and trough of the improved poultry feeder and exerciser showing the manner of supporting the hopper. Fig. 4 is a section on line *a a*, Fig. 3.

In referring to the drawings in detail like numerals designate like parts.

The device consists of a separate and independent feed containing element which is supported by itself and mechanism arranged relatively to the feed containing element upon which the fowl are compelled to exercise in order to reach the food contained therein.

In the preferred adaptation of the invention illustrated in the drawings, a feed trough which is a separate and distinct element and is supported by itself is located between two tread mill mechanisms upon which the fowl step to reach the trough, the tread mill mechanism being pivotally supported from the feed trough.

The feed trough 1 is mounted upon legs 2 of suitable length to elevate the trough to the proper height above the ground and above the trough is mounted a feed magazine or hopper 3 from which feed gradually drops by gravity into the trough as it is removed therefrom by the fowl.

The exercising mechanism consists of two tread mills which are pivoted at their inner ends to opposite sides of the trough as shown in Figs. 1 and 2. Provision is made for varying the elevation of the outer ends of the tread mills so that they may be arranged upon any suitable angle from the horizontal in order to obtain the desired exercising speed for the fowl. As the two tread mills are identical a description of one will suffice for both. The tread mills are each provided with a frame which is preferably of metal having two side members 4 and 5 and an end member 6, the side members being extended outwardly beyond the end member and then bent back upon themselves and extended inwardly to the end member where they are bent at right angles at the juncture with the end member. From this construction an outer end portion 7, of double thickness is provided on each side member and an outer roll 8 is journaled between said end portions 7 and outside of the end member. An inner roll 9 is journaled between the side members in fairly close proximity to the feed trough and an intermediate roll 10 is journaled between intermediate portions of the side members. A loop 11 of canvas or other suitable material is fitted around the outer and inner rolls 8 and 9 and is supported intermediately between the rolls 8 and 9 by the roll 10, see Fig. 1. The outer ends of the tread mills are adjustably supported by means of legs 12 which are arranged in pairs and pivoted at their upper ends to the tread mill frames. These legs 12 may be turned to a vertical position to support the tread mill in practically a horizontal portion as shown in dotted lines on the left hand side of Fig. 1 or may be spread apart to extend at an angle to each other and thereby lower the outer end of the tread mill to any desired incline.

While this device is particularly designed for feeding and exercising fowl it may be utilized with good results in the feeding of live stock.

Although the exercising mechanism is shown herein only in connection with a feeding trough it is obvious that a watering trough or the like is equally adapted to be utilized in conjunction with the same.

I claim—

1. The combination with a central feed trough, of two exercising mechanisms pivoted at their inner ends to opposite sides of the trough and means for supporting the outer ends of said exercising mechanisms.

2. The combination with a feed trough, of two tread mills located on opposite sides of the trough and pivoted thereto and means for varying the angle of inclination of the tread mills.

3. The combination with a feed trough, of a tread mill mechanism consisting of a frame pivoted to the feed trough, rolls journaled in the frame, and a loop of flexible material supported by the rolls.

4. In a device of the class described, a trough, legs supporting said trough and an exercising mechanism having a frame pivoted to the trough.

5. In a device of the class described, a trough, legs supporting said trough and an exercising mechanism having a frame pivoted at its inner end to the trough, and legs for supporting the outer end of said frame.

6. In a device of the class described, a trough, legs supporting said trough and an exercising mechanism having a frame pivoted at its inner end to the trough, and legs for supporting the outer end of the frame; said outer supporting legs being pivoted to the frame.

7. In a device of the class described, a trough, legs supporting said trough and an exercising mechanism having a frame pivoted at its inner end to the trough, and legs for supporting the outer end of the frame; said outer supporting legs being pivoted in pairs to the frame.

8. In a device of the class described, a trough, legs supporting said trough and an exercising mechanism having a frame pivoted at its inner end to the trough, and legs for supporting the outer end of the frame; said outer supporting legs being pivoted to the frame and being adapted to be turned to different angles on their pivots.

EDWARD W. FRANKLIN.

Witnesses:
NELSON J. PALMER,
CHAUNCEY L. SNOW.